United States Patent

[11] 3,617,184

| [72] | Inventors | Johannes Eibl<br>Burscheid, Kaltenherberg;<br>Walther Wolf, Leverkusen; Günther<br>Boehmke, Leverkusen, Grossendriesch, all<br>of Germany |
|---|---|---|
| [21] | Appl. No. | 867,080 |
| [22] | Filed | Oct. 16, 1969 |
| [45] | Patented | Nov. 2, 1971 |
| [73] | Assignee | Farbenfabriken Bayer Aktiengesellschaft<br>Leverkusen, Germany |
| [32] | Priority | Oct. 23, 1968 |
| [33] | | Germany |
| [31] | | P 18 04 527.7 |

[54] N-ALKYL OR N-ALKOXYLALKYL
PHTHALIMIDES MIXED WITH AMINO-IMINO
PYRROLENINES AND DYEING THEREWITH
5 Claims, No Drawings

| [52] | U.S. Cl. | 8/85, 8/62,<br>8/93 |
|---|---|---|
| [51] | Int. Cl. | D06p 1/68 |
| [50] | Field of Search | 8/1 XA,<br>172, 85; 260/314.5 |

[56] References Cited
UNITED STATES PATENTS

| 2,683,643 | 7/1954 | Baumann | 8/1 XA |
|---|---|---|---|
| 2,761,868 | 9/1956 | Lacey | 260/314.5 |
| 3,063,780 | 11/1962 | Rosch et al. | 260/314.5 |

Primary Examiner—Donald Levy
Attorney—Plumley and Tyner

ABSTRACT: Porphyrazine dye forming amino-imino-pyrrolenine, such as the phthalocyanine forming amino-imino-isoindolenine, is mixed with an N-substituted phthalimide of the following formula:

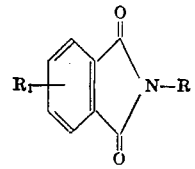

where R is a haloalkyl-, acyloxyalkyl-, carboxyalkyl-, hydroxyalkyl-, alkoxycarbonylalkyl- or alkyl- group, the chains of which contain one to eight carbon atoms and can be interrupted by oxygen atoms to form alkoxyalkyl chains; $R_1$ is a hydrogen, halogen, short chain alkoxy, short chain alkyl carboxylic acid ester, phenyl or nitro-group. Hydrotropic agents, such as hydroxyalkyl ureas can be mixed with the phthalimide.

N-ALKYL OR N-ALKOXYLALKYL PHTHALIMIDES MIXED WITH AMINO-IMINO PYRROLENINES AND DYEING THEREWITH

The invention relates to a process for the dyeing and printing of textile materials by impregnation of the textile materials with amino-imino-pyrrolenines in the presence of copper or nickel compounds and subsequent thermal after-treatment; more particularly it concerns a process wherein as auxiliaries are used N-substituted phthalimides of the formula

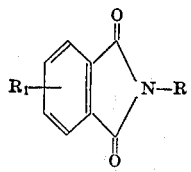

in which
R stands for an alkyl radical which may be substituted by halogen, a hydroxyl, acyloxy, carboxyl, or alkoxy-carbonyl group and contains one to eight carbon atoms in all, and the carbon chain of which may be interrupted by oxygen atoms and
$R_1$ denotes hydrogen halogen, preferably a chlorine, a hydroxyl, lower alkoxy, lower alkoxycarbonyl, phenyl or nitro group.

Examples of alkyl radicals R are: the methyl, ethyl, propyl, isopropyl, butyl, isobutyl, 2-ethylhexyl, ethoxymethyl, propoxymethyl, 3-hydroxy-propyl-(1), 3-chlotoro-propyl-(1), 3-methoxypropyl-(1), 2-acetoxyethyl-(1), 3-propionyloxypropyl-(1), 3-methoxy-carbonylpropyl-(1) and 5-ethoxycarbonylpentyl-(1), radicals.

Representatives of the phthalimide derivatives of the formula (I) to be used according to the invention are, for example: N-ethyl-phthalimide, N-isopropyl-phthalimide, N-butyl-phthalimide, N-isobutyl-phthalimide, N-(2-ethylhexyl)-phthalimide, N-ethoxymethyl-phthalimide, N-propoxymethyl-phthalimide, N-(3-hydroxy-propyl)-phthalimide, N-(3-methoxy-propyl)-phthalimide, N-acetoxyethyl-phthalimide, N-(3-propionyloxy-propyl)-phthalimide, 4-phthalimido-butyric acid-methyl ester, 6-phthalimido-caproic acid ethyl ester, and the corresponding N-derivatives of 3- and 4chlorophthalic acid imide, 3and 4-nitro-phthalic acid imide and 4-phenyl-, 4-hydroxy-, 4-methoxy-, 4-ethoxy-, 4-methoxycarbonyl- and 4-ethoxycarbonyl-phtalic acid imide.

The phthalimide derivatives of the formula (I) to be used according to the invention can be obtained according to known processes.

Amino-imino-pyrrolenines which can be used for the process according to the invention are those amino-imino-pyrrolenines which form porphyrazines under the conditions of dyeing and printing in the presence of copper or nickel compounds; in particular the following:

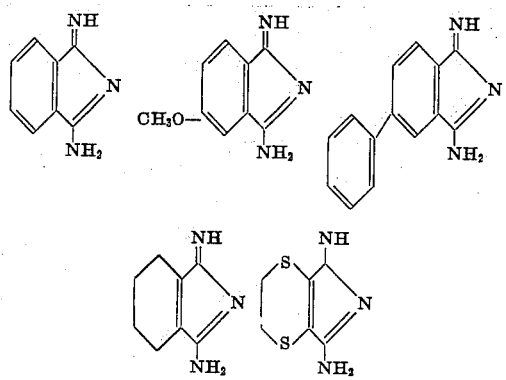

Copper and nickel compounds suitable for the process according to the invention are inorganic salts, such as copper chloride, nickel chloride or copper sulfate, but primarily organic copper and nickel compounds, for example, the acetates, and, above all, the complex compounds of copper and nickel with N-methyl-aminoacetic acid, N-methyl-N-hydroxyethyl-aminoacetic acid, trimethylamine-tricarboxylic acid, ethylene-diamine-tetraacetic acid.

In the process according to the invention, the textile materials are padded with padding liquors or printed with printing pastes in the usual way and subsequently subjected to a thermal aftertreatment for development of the dyestuff; this aftertreatment may consist in a treatment with steam, dry overheated steam or hot air or by contact heating.

The preparation of printing pastes can advantageously be carried out by mixing amino-imino-pyrrolenines with the N-substituted phthalimides, dissolving the mixture together with the copper or nickel compound in water, and stirring the solution into a suitable commercial thickening agent. If the fixation of the dyestuff is carried out by hot air or by contact heating, an addition of urea to the printing pastes has proved to be of advantage.

When preparing the padding liquors, it has proved advantageous, especially if high demands are made on the stability of the padding liquors, to add hydrotropic agents, such as formamide, alkoxylated ureas, e.g. hydroxyethyl-, bis-hydroxyethyl-, hydroxy-propyl- or bis-hydroxypropyl-urea, triethylene glycol, glycerol or phenoxy-ethanol, and/or emulsifiers, such as an alkylphenol polyglycol ether or aralkylphenol polyglycol ether. If the dyestuff fixation is carried out with hot air or by contact heating, it has moreover proved expedient to add urea to the padding liquors.

The amounts in which the N-substituted phthalimides to be used according to the invention are added for dyeing and printing, may vary within wide limits: in general, the addition of 6-20 percent by weight, referred to the weight of amino-imino-pyrrolenines used, has proved advantageous.

If hydrotropic agents and/or emulsifiers are used, in addition to the N-substituted phthalimides, it has proved advantageous to add these in a total amount of about 6-40 percent by weight, referred to the weight of the amino-imino-pyrrolenines used.

The addition of the N-substituted phthalimides to be used according to the invention makes it possible either completely to save the additional organic solvents and hydrotropic agents required for the preparation of the padding liquors and printing pastes, or substantially to reduce the amount of these additives. By adding the phthalimides it is possible to apply the amino-imino-pyrrolenines from pure aqueous solutions or from aqueous solutions containing only small amounts of organic solvents to the textile materials and there to convert them into porphyrazines. Hitherto it has been necessary, in order to suppress the hydrolysis of the amino-imino-pyrrolenines, to use the pyrrolenines in the aqueous liquors with at least twice to three times their weight of organic solvents; if the dyeing was to be carried out from more diluted aqueous baths, the proportion of organic solvents had to be increased.

The parts given in the following examples are parts by weight.

EXAMPLE 1

Fifty g. amino-imino-isoindolenine are mixed with 10 g. N-butyl-phthalimide and the mixture is added to 200 g. of water at about 37° C. containing 5 g. of 25 percent aqueous ammonia. After the addition of 16 g. of the copper complex of N-methyl-N-hydroxy-ethyl-aminoacetic acid to the solution, the latter is introduced into a conventional starch-tragacanth thickening agent and made up with cold water to 1,000 g.

A cotton fabric is printed with the printing paste so obtained, subsequently dried and steamed at 100°-102° C. for 5 minutes. After acidification at 80°-90° C. for 30 seconds with a hydrochloric acid containing 3-10 g. of concentrated hydrochloric acid per liter, the material is rinsed and soaped at the boil. A very clear and deep blue print is obtained.

A print of equal strength of color is obtained on a fabric of regenerated cellulose.

The same result was achieved when the 10 g. N-butyl-phthalimide were replaced with 10 g. N-ethoxymethyl-phthalimide.

EXAMPLE 2

Fifty g. amino-imino-isoindolenine are mixed with 4.5 g. N-methoxyethyl-phthalimide, 4.5 g. N-hydroxypropyl-phthalimide and 1 g. N-butyl-phthalimide. The powder so obtained is mixed with 12 g. of the copper complex mentioned in example 1 and ground with 10 g. urea. This powder is dissolved in 204 g. of water and, after the addition of 5 g. of 25 percent ammonia and 60 g. urea, introduced into 659 g. of a conventional starch-tragacanth thickening agent.

A cotton fabric is printed with the printing paste so prepared. After drying, the dyestuff is fixed and developed on the fabric by steaming at 102° C. for 8 minutes. After acidification with an aqueous solution containing 10 g. of concentrated hydrochloric acid per liter at 80°–90° C. for 30 seconds, rinsing and washing at boiling temperature, a clear brilliant blue print is obtained.

EXAMPLE 3

Forty g. amino-imino-isoindolenine are mixed with 10 g. N-propionyloxypropyl-phthalimide and the mixture is dissolved in 200 g. of water at about 35°–40° C. The solution is mixed with 70 g. urea, 5 g. of 25 percent aqueous ammonia and 16 g. of the copper complex mentioned in example 1, and diluted to a volume of 1 liter with cold water. A cotton fabric is padded with this solution in the usual way. After drying, the dyeing is fixed on the fabric by treatment with neutral saturated steam and subsequently subjected at 80° C. to an acidic-reductive aftertreatment with an aqueous solution containing 10 g. of concentrated hydrochloric acid and 1.5 g. sodium nitrite per litre; the material is then rinsed and soaped at the boil. A deep clear blue dyeing is obtained.

EXAMPLE 4

Twenty g. amino-imino-isoindolenine are mixed with 1 g. N-propionyloxypropyl-phthalimide; the mixture is treated with 8 g. of the copper complex mentioned in example 1, 50 g. urea and 30 g. triethylene glycol, dissolved in water and the solution diluted to a volume of 1 liter.

A cotton fabric is padded with this solution. After squeezing to a weight increase of 80–90 percent and drying, the dyestuff is developed by treatment with hot air at 135° C. for 4 minutes. The fabric is subsequently aftertreated at 80° C. for 30 seconds with an aqueous solution containing, per litre, 2 g. sodium nitrate and 10 ml. of concentrated sulfuric acid, it is then rinsed, soaped at the boil and again rinsed. A clear blue dyeing is obtained.

EXAMPLE 5

Forty g. amino-imino-isoindolenine are mixed with 4 g. N-butyl-phthalimide and 6 g. nonylphenolheptaglycolether. This mixture is dissolved in 200 g. of water while stirring. The solution is mixed with 70 g. urea and 10 g. of the copper complex mentioned in example 1 which has been dissolved in 200 g. of water, and it is then diluted with cold water to a volume of 1 liter.

A cotton fabric is padded with this solution in the usual way. After squeezing to a weight increase of 80–90 percent and drying, the dyestuff is developed by treatment with hot air at 135°–140° C. for 3–4 minutes. The fabric is subsequently aftertreated as described in example 4. A deep clear blue dyeing is obtained.

EXAMPLE 6

Fifty g. amino-imino-isoindolenine are mixed with 5 g. of a mixture consisting of 3 parts N-butyl-phthalimide and 1 part N-tert.-butyl-phthalimide, 7 g. nonylphenolheptaglycolether, and 5 g. bis-hydroxypropyl-urea. The mixture is dissolved in 200 ml. of water while stirring. The solution is mixed with 50 g. urea and 10 g. of the copper complex mentioned in example 1 which has been dissolved in 200 ml. of water, and it is then diluted with water at 15°–25° C. to a volume of 1 liter.

A cotton fabric is padded with this solution. After squeezing to a weight increase of 80–90 percent and drying, the dyestuff is developed by treatment with hot air at 135°–140° C. for 3 to 4 minutes. The fabric is subsequently aftertreated as described in example 4. A clear blue dyeing is obtained.

EXAMPLE 7

Thirty g. amino-imino-isoindolenine are mixed with 3 g. N-propionyloxypropyl-phthalimide, 6 g. nonylphenolheptaglycolether, 1.7 g. bis-hydroxypropyl-urea, and 1.7 g. phenoxy-ethanol. The mixture is dissolved in 200 g. of water. The solution is mixed with a solution of 8 g. of the copper complex of ethylene-diamine-tetraacetic acid in 200 g. of water and 70 g. urea, and diluted with cold water to a volume of 1 liter.

A cotton fabric is padded with this solution. It is then further treated as described in example 6. A clear strong blue dyeing is obtained.

EXAMPLE 8

Eighty g. methoxy-amino-imino-isoindolenine are pasted with 80 g. of a mixture of
1 part N-butyl-phthalimide
25 parts bis-hydroxypropyl-urea
25 parts formamide
6 parts nonylphenolheptaglycolether and
10 parts phenoxyethanol.

The mixture is dissolved in 200 ml. of water. The solution is mixed with 16 g. of the copper complex mentioned in example 1 which has been dissolved in 300 ml. of water, and it is then diluted with cold water to a volume of 1 liter.

A cotton fabric is padded with this padding solution. After squeezing to a weight increase of 80–90 percent and drying, the dyestuff is developed by treatment with neutral steam for 5 minutes. Aftertreatment as described in example 3 yields a deep clear green dyeing.

We claim:

1. Process for the dyeing and printing of textile materials comprising impregnating the textile material with aminoiminopyrrolenines, copper or nickel compounds, and N-substituted phthalimides of the formula

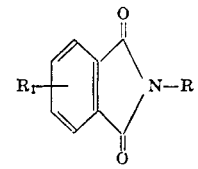

R is a radical containing one to eight carbon atoms selected from the group consisting of alkyl, alkoxyalkyl and alkyl substituted with halogen, hydroxyl, alkanoyloxy, carboxyl, or alkoxycarbonyl; $R_1$ is hydrogen, halogen, hydroxyl, lower alkoxy, lower alkoxycarbonyl, phenyl or nitro.

2. The process of claim 1 containing, in addition a hydroxyalkyl urea hydrotropic agent, an emulsifier or a mixture thereof.

3. The process according to claim 2 wherein the hydrotropic agent is a member of the group consisting of hydroxyethyl-urea, bis-hydroxyethyl-urea, hydroxypropyl-urea and bis-hydroxypropyl-urea.

4. A dye composition comprising an aminoiminopyrrolenine, copper or nickel compounds, and an N-substituted phthalimide of the formula

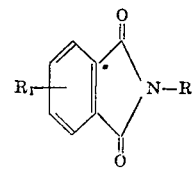

R is a radical containing one to eight carbon atoms selected from the group consisting of alkyl, alkoxyalkyl and alkyl substituted with halogen, hydroxyl, alkanoyloxy, carboxyl, or alkoxycarbonyl; $R_1$ is hydrogen, halogen, hydroxyl, lower alkoxy, lower alkoxycarbonyl, phenyl or nitro; and a hydroxyalkyl urea hydrotropic agent, an emulsifier or a mixture of said hydrotropic agent and emulsifier.

5. The composition of claim 4 wherein the hydrotropic agent is hydroxyethyl-urea, bis-hydroxyethyl-urea, hydroxypropyl-urea or bis-hydroxypropyl-urea.

* * * * *